United States Patent
Matsui et al.

(10) Patent No.: US 7,012,454 B2
(45) Date of Patent: Mar. 14, 2006

(54) CLOCK SHIFT CIRCUIT FOR GRADUAL FREQUENCY CHANGE

(75) Inventors: Satoshi Matsui, Kawasaki (JP); Yukihiro Ozawa, Kawasaki (JP); Seiji Suetake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/796,005

(22) Filed: Mar. 10, 2004

(65) Prior Publication Data

US 2005/0083098 A1    Apr. 21, 2005

(30) Foreign Application Priority Data

Oct. 15, 2003    (JP)    ............... 2003-355061

(51) Int. Cl.
*H03B 19/00*    (2006.01)
(52) U.S. Cl. ............... 327/114; 327/299; 713/501
(58) Field of Classification Search ............... 327/291, 327/294–299, 113–117; 713/500–502, 322
See application file for complete search history.

(56) References Cited

U.S. PATENT DOCUMENTS 5,471,251 A * 11/1995 Inaba et al. ............... 348/634
5,822,596 A * 10/1998 Casal et al. ............... 713/322
6,223,297 B1 * 4/2001 Inoue ............... 713/501
6,301,070 B1 * 10/2001 Sakaguchi ............... 360/73.03
6,448,996 B1    9/2002 Suganuma ............... 347/248
6,614,865 B1 * 9/2003 Ishimi ............... 375/373

FOREIGN PATENT DOCUMENTS

| JP | 2000-183729 | 6/2000 |
| JP | 2000-202829 | 7/2000 |
| JP | 2001-213002 | 8/2001 |
| JP | 2002-202829 | 7/2002 |

* cited by examiner

*Primary Examiner*—Minh Nguyen
(74) *Attorney, Agent, or Firm*—Staas & Halsey LLP

(57) ABSTRACT

A circuit for changing clocks includes a clock generating circuit which generates an output clock signal by controlling a frequency of an original clock signal, and a control circuit which controls the clock generating circuit in response to an operation mode change signal indicative of a change from a first operation mode to a second operation mode of an external circuit operating based on the output clock signal, thereby changing the output clock signal from a first frequency corresponding to the first operation mode to an intervening frequency and then from the intervening frequency to a second frequency corresponding to the second operation mode, the intervening frequency having a frequency between the first frequency and the third frequency.

9 Claims, 6 Drawing Sheets

FIG.2

| MODE CHANGE SIGNAL | CLOCK CHANGE PATTERN | DURATION |
|---|---|---|
| STOP | 3/4→1/2→1/4 | 1ms |
| SLEEP | 7/8→3/4→5/8→1/2→3/8→1/4→1/8 | 1ms |
| SHUTDOWN | 1/2 | 1ms |
| START | 1/4→1/2→3/4 | 500μs |

CLOCK SHIFT CIRCUIT FOR GRADUAL FREQUENCY CHANGE

CROSS-REFERENCE TO RELATED APPLICATIONS

The present application is based upon and claims the benefit of priority from the prior Japanese Patent Application No. 2003-355061 filed on Oct. 15, 2003, with the Japanese Patent Office, the entire contents of which are incorporated herein by reference.

BACKGROUND OF THE INVENTION

1. Field of the Invention

The present invention generally relates to circuits for generating a clock signal of a desired frequency, and particularly relates to a clock shift circuit which changes a clock signal from a given frequency to another frequency.

2. Description of the Related Art

In large-scale logic circuits such as semiconductor integrated circuits, a technology for controlling the supply of clock signals inside a circuit as circumstances demand is becoming increasingly important for the purpose of cutting down power consumption. Especially in portable equipment for which power consumption is an important issue, such technology is widely used.

Conventionally, the control of start/stop of clock supply is not taken care of by the system. In a general configuration, the start/stop of clock supply is made simply in response to power-on and power-off. With the widespread use of portable equipment and an increase in circuit size, standby power consumed by load capacitance associated with clock signal lines can no longer be disregarded, making it necessary to control the start/stop of clock signals.

When a transition is made from a clock active state using a normal operating frequency to a clock suspended state such as a standby state, or when return from the clock suspended state is made, a clock generally comes to a sudden stop or makes a sudden start to immediately oscillate at the normal operating frequency. When a clock is suddenly changed in such a manner, circuitry that uses the clock generates a sudden change in the consumption of electric currents. This may cause regulators inside semiconductor integrated circuits to generate abnormal voltages.

Because of this, it is desirable to change clock frequency gradually between the clock active state using the normal operating frequency and the clock suspended state. To this end, a clock generating circuit with the function to switch clock frequencies is required, an example of which is disclosed in Patent Documents 1 through 3.

A circuit taught by Patent Document 1 includes an oscillator that operates at high speed, a decimated clock circuit that outputs a plurality of decimated clocks, and a frequency divider. The decimated clock circuit generates a set of base frequencies, and the frequency divider divides the frequencies for outputting.

In Patent Document 2, an image recording apparatus includes a decimating means for decimating an original clock supplied from an original clock generating means, and a frequency dividing means for dividing the decimated clock by a fixed division rate for outputting as a pixel clock for image recording purposes.

In Patent Document 3, provision is made to divide an original clock by frequency division rates responsive to power supply voltage. By using a large number of bits or increasing the number of the frequency division rates, the original clock can be divided by an increased number of frequency division rates, without the addition of a frequency division circuit to hardware.

[Patent Document 1] Japanese Patent Application Publication No. 2000183729.
[Patent Document 2] Japanese Patent Application Publication No. 2001-213002.
[Patent Document 3] Japanese Patent Application Publication No. 2002-202829.

SUMMARY OF THE INVENTION

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a clock shift circuit particularly pointed out in the specification in such full, clear, concise, and exact terms as to enable a person having ordinary skill in the art to practice the invention.

To achieve these and other advantages in accordance with the purpose of the invention, the invention provides a circuit for changing clocks, including a clock generating circuit which generates an output clock signal by controlling a frequency of an original clock signal, and a control circuit which controls the clock generating circuit in response to an operation mode change signal indicative of a change from a first operation mode to a second operation mode of an external circuit operating based on the output clock signal, thereby changing the output clock signal from a first frequency corresponding to the first operation mode to a third frequency and then from the third frequency to a second frequency corresponding to the second operation mode, the third frequency having a frequency between the first frequency and the second frequency.

According to one embodiment of the invention, the clock generating circuit described above includes a frequency divider which generates one or more frequency-divided clock signals by dividing the original clock signal, a selector circuit which selects one of the original clock signal and the one or more frequency-divided clock signals as a selected clock signal, and a decimated clock generating circuit which decimates one or more clock pulses of the selected clock signal for outputting as the output clock signal, wherein the control circuit controls the selection performed by the selector circuit and the decimation performed by the decimated clock generating circuit in response to the operation mode change signal.

In the invention as described above, the control signal controls the clock generating circuit (the selector circuit and the decimated clock generating circuit) according to a mode change signal, thereby gradually changing the clock signal at the time of a change of operation modes. Namely, when a change is made from a clock active state using a normal operating frequency to a clock suspended state, the clock signal is controlled such that the number of clock pulses per unit time is decreased gradually. When a change is made from a clock suspended state to a clock active state using a normal operating frequency, the clock signal is controlled such that the number of clock pulses per unit time is increased gradually. This avoids a sudden clock change, thereby preventing the consumption of electric currents from changing suddenly in circuitry using the clock signal, which prevents a regulator from generating an abnormal voltage.

Moreover, the use of the frequency divider and the decimated clock generating circuit makes it possible to generate a clock signal having any desired frequency of n/m (n, m: integers) that cannot be generated by use of the frequency divider alone. This achieves finer changes when the clock frequency is changed. Moreover, hardware-based control according to the invention can achieve high-speed operation that is not attainable by software-based control according to the conventional art.

Further features of the present invention will be apparent from the following detailed description when read in conjunction with the accompanying drawings.

BRIEF DESCRIPTION OF THE DRAWINGS

FIG. 2 is a diagram showing clock change patterns and durations with respect to mode change signals;

DESCRIPTION OF THE PREFERRED EMBODIMENTS

The technology disclosed in these patent documents only teaches a clock generating circuit with the function to switch clock frequencies. There is no mention of a construction by which a clock is gradually speeded up or gradually speeded down in response to the switching of operation modes. There is a related-art technology that controls the speeding-up operation of a clock by use of software. This technology has a drawback in that high speed operation cannot be attained, and also has shortcomings in that a clock having a frequency between 1/n and 1/(n+1) cannot be generated.

Accordingly, there is a need for a clock shift circuit that can change a clock frequency gradually in response to a change of operation modes.

It is a general object of the present invention to provide a clock shift circuit that substantially obviates one or more problems caused by the limitations and disadvantages of the related art.

In the following, embodiments of the present invention will be described with reference to the accompanying drawings.

Figure 1:
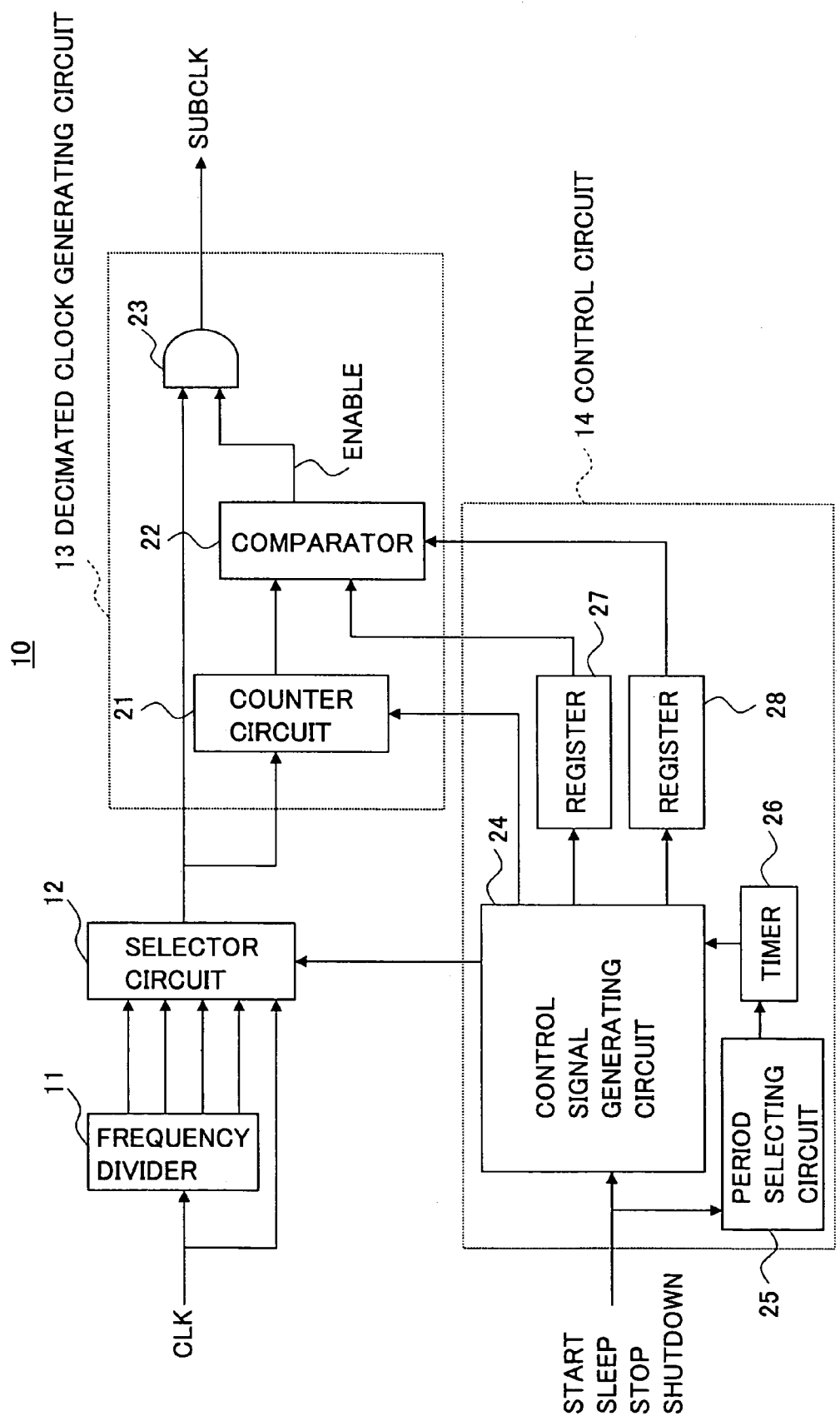
FIG. 1 is a block diagram showing the construction of a clock shift circuit according to the invention.

FIG. 1 is a block diagram showing the construction of a clock shift circuit according to the invention.

A clock shift circuit 10 of FIG. 1 includes a frequency divider 11, a selector circuit 12, a decimated clock generating circuit 13, and a control circuit 14. A clock signal CLK is input into the frequency divider 11 and the selector circuit 12. The frequency divider 11 divides the clock signal CLK to generate a clock signal of ½ frequency division, a clock signal of ¼ frequency division, a clock signal of ⅛ frequency division, and a clock signal of 1/16 frequency division, for example.

The selector circuit 12 responds to an instruction from the control circuit 14 to select one clock signal from a plurality of frequency-divided clock signals output by the frequency divider 11 and the clock signal CLK that is the original clock. The selected clock signal is supplied to the decimated clock generating circuit 13.

The decimated clock generating circuit 13 operates under the control of the control circuit 14 to decimate the clock pulses of the selected clock signal supplied from the selector circuit 12, thereby generating a decimated clock signal SUBCLK.

Mode change signals START, SLEEP, STOP, and SHUTDOWN indicative of a change of operation modes are supplied to the control circuit 14. The mode change signal SLEEP indicates a change of state to a sleep mode, and the signal STOP indicates a change of state to a stop mode. The signal SHUTDOWN indicates a change to a power supply suspended state. Further, the mode change signal START indicates return from these states.

According to these mode change signals, the control circuit 14 controls the selector circuit 12 and the decimated clock generating circuit 13 to change the clock signal gradually at the time of a mode change. When a change is made from a clock active state using a normal operating frequency to a clock suspended state, the clock signal is controlled such that the number of clock pulses per unit time is decreased gradually. When a change is made from a clock suspended state to a clock active state using a normal operating frequency, the clock signal is controlled such that the number of clock pulses per unit time is increased gradually.

The decimated clock generating circuit 13 includes a counter circuit 21, a comparator 22, and an AND gate 23. When the counter circuit 21 is reset at the timing indicated by a reset signal supplied from the control circuit 14, the counter circuit 21 starts counting the pulses of the selected clock signal supplied from the selector circuit 12. The count by the counter circuit 21 is supplied to the comparator 22.

The comparator 22 compares the count from the counter circuit 21 with a preset pulse number supplied from the control circuit 14. If the count is below the preset pulse number, the comparator 22 sets its output signal ENABLE to HIGH. With this provision, when the count is below the preset pulse number, the AND gate 23 allows passage of the selected clock signal supplied from the selector circuit 12. If the count is larger than the preset pulse number, the AND gate 23 blocks the selected clock signal supplied from the selector circuit 12.

The comparator 22 further receives a preset bit number from the control circuit 14. The preset bit number is information indicative of the number of bits that are subjected to the comparison of the count and the preset pulse number. That is, a different preset bit number produces a different comparison result even if the preset pulse number is the same. If the preset bit number is 3 and the present pulse number is 3, for example, three bits are subjected to comparison. As a result, the signal ENABLE is HIGH while first three of the eight pulses ($=2^3$) are supplied. If the preset bit number is 4 and the present pulse number is 3, for example, four bits are subjected to comparison. As a result, the signal ENABLE is HIGH while first three of the sixteen pulses ($=2^4$) are supplied. In this manner, the combination of the preset pulse number and the preset bit number can control the rate of pulse decimation of the selected clock signal.

The control circuit 14 includes a control signal generating circuit 24, a period selecting circuit 25, a timer 26, a register 27, and a register 28. The control signal generating circuit 24 and the period selecting circuit 25 receive the mode change signals START, SLEEP, STOP, and SHUTDOWN indicative of a change of operation modes.

The period selecting circuit 25 selects a duration of each clock frequency according to the supplied mode change signals. The period selecting circuit 25 supplies a signal indicative of the selected duration to the timer 26. The timer 26 measures the selected duration, and asserts a signal to the control signal generating circuit 24 until an end of the duration, for example. The control signal generating circuit 24 controls the selector circuit 12 and the decimated clock generating circuit 13 to generate a clock signal having a predetermined frequency (a predetermined number of pulses) during the duration indicated by the signal supplied from the timer 26.

Specifically, the control signal generating circuit 24 sets the preset pulse number and the preset bit number in the registers 27 and 28, respectively, resetting the counter circuit 21 to initialize a decimation operation, and supplying a selection signal to the selector circuit 12 to select a desired clock signal. The preset pulse number and the preset bit number stored in the respective registers 27 and 28 are supplied to the comparator 22. With this provision, the selector circuit 12, the counter circuit 21, and the comparator 22 operate in the manner as previously described, thereby decimating clock pulses at a desired ratio.

FIG. 2 is a diagram showing clock change patterns and durations with respect to the mode change signals. The clock change pattern shows the way a clock transition is made, and is selected by the control signal generating circuit 24 in response to each mode change signal. The duration is selected by the period selecting circuit 25 in response to each mode change signal. The period selecting circuit 25 may store data indicative of settings of durations in its internal register.

If the mode change signal STOP indicating a state change to the stop mode is asserted, for example, the control signal generating circuit 24 selects a clock change pattern of ¾→½→¼, and performs control operation accordingly. Moreover, the period selecting circuit 25 selects 1 ms as a duration. As a result, ¾ the clock frequency lasts 1 ms after the normal clock frequency, and, then, ½ the clock frequency lasts 1 ms, followed by ¼ the clock frequency lasting for 1 ms. In this manner, the number of pulses per unit time is gradually decreased until the clock comes to a complete stop in the end.

If the mode change signal SLEEP indicating a state change to the sleep mode is asserted, for example, the control signal generating circuit 24 selects a clock change pattern of ⅞→¾→⅝→½→⅜→¼→⅛, and performs control operation accordingly. Moreover, the period selecting circuit 25 selects 1 ms as a duration. As a result, starting from the normal clock frequency, each of the successive clock frequencies lasts 1 ms, thereby gradually decreasing the number of pulses per unit time until the clock comes to a complete stop in the end.

If the mode change signal SHUTDOWN indicating a transition to the power supply suspended state is asserted, ½ the clock frequency lasts 1 ms after the normal clock frequency, followed by a suspension of the clock. If the mode change signal START indicating return is asserted, ¼ the clock frequency lasts 500 microseconds after the clock suspended state, and, then, ½ the clock frequency lasts 500 microseconds, followed by ¾ the clock frequency lasting for 500 microseconds. In this manner, the number of pulses per unit time is gradually increased until the clock reaches the normal operating frequency.

Figure 3:
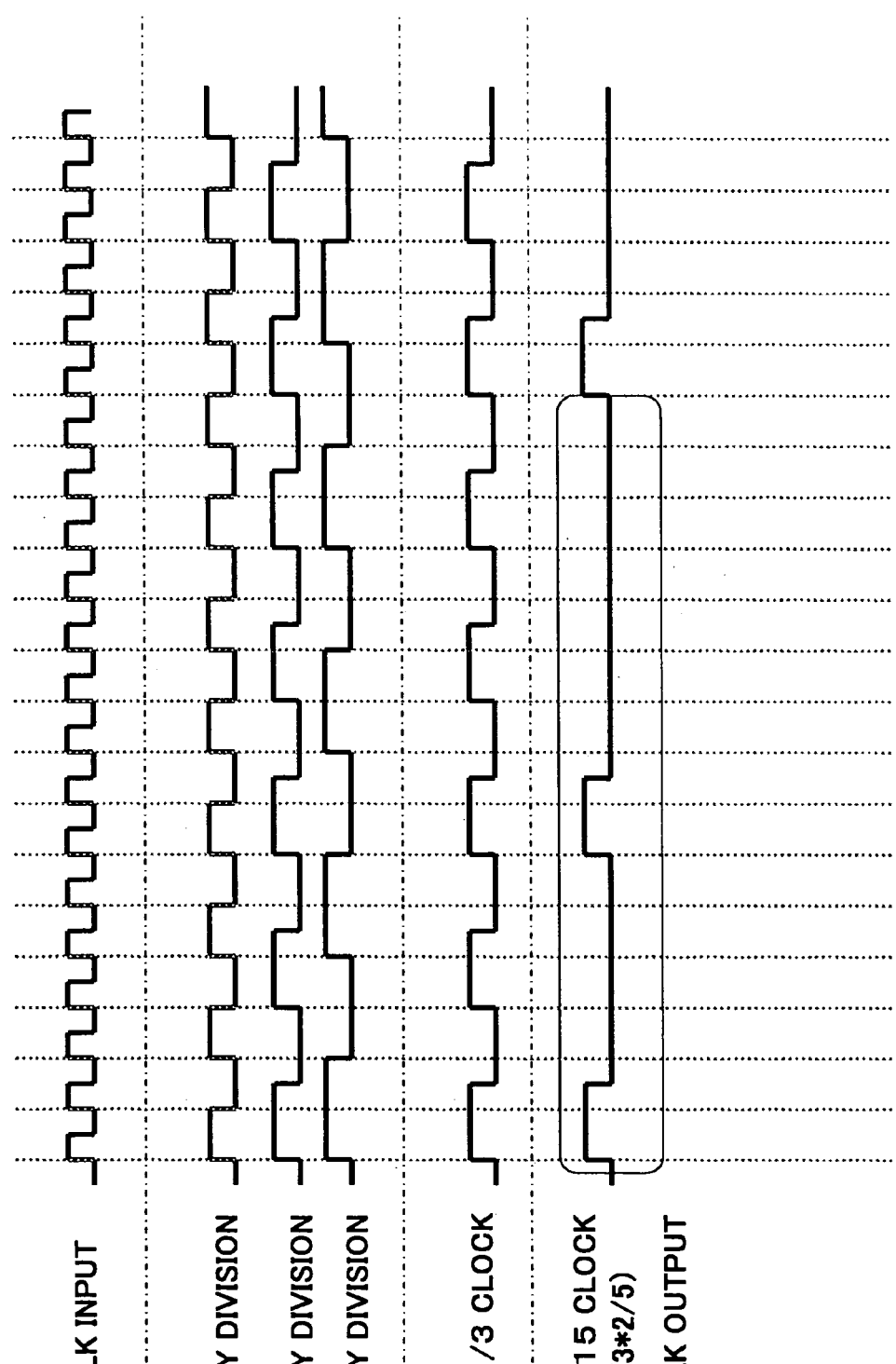
FIG. 3 is a diagram for explaining the frequency division and decimation of a clock signal.

FIG. 3 is a diagram for explaining the frequency division and decimation of a clock signal.

The clock signal CLK that is an original clock is shown at the top section of FIG. 3. The second section of FIG. 3 shows the frequency-divided clock signals generated by the frequency divider 11 based on the clock signal CLK. In this example, a clock signal of ½ frequency division, a clock signal of ⅓ frequency division, and a clock signal of ¼ frequency division are generated. The third section of FIG. 3 illustrates the selected clock signal that is selected by the selector circuit 12. In this example, the ⅓-frequency-division clock signal (i.e., having ⅓ the frequency) is selected from the frequency-divided clock signals output from the frequency divider 11.

The bottom section of FIG. 3 demonstrates the decimated clock signal SUBCLK generated by the decimated clock generating circuit 13 decimating the pulses of the selected clock signal. In this example, two pulses are chosen in every five pulses of the ⅓-frequency-divided selected clock signal (i.e., three pulses are blocked), thereby generating the decimated clock signal SUBCLK of 2/15 the frequency (i.e., the number of pulses per unit time is 2/15).

In the example of FIG. 3, the first pulse and the third pulse are chosen as the two pulses from every five pulses. The construction of FIG. 1, on the other hand, is configured to select a desired number of first consecutive pulses from the preset number of pulses. That is, when two pulses are to be selected from every five pulses, the first pulse and the second pulse that are first two consecutive pulses are chosen. The construction of the decimated clock generating circuit 13 of FIG. 1 can easily be modified so as to select inconsecutive pulses as shown in FIG. 3. The selection of pulse positions is not an essential part of the invention. From a certain point of view, FIG. 1 provides the simplest circuit construction of the decimated clock generation means.

Figure 5:
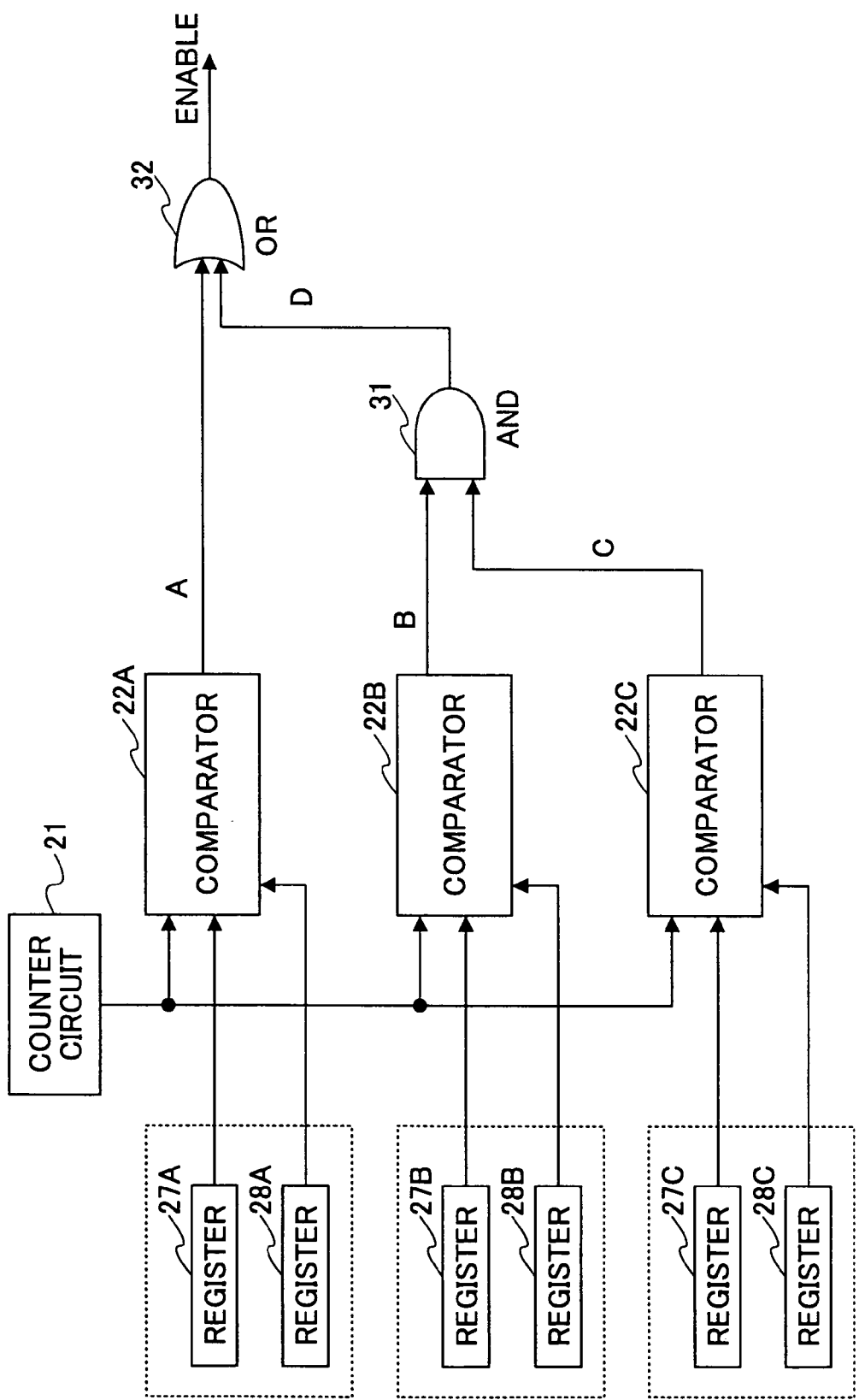
FIG. 5 is a circuit diagram showing an example of a modified construction of the decimated clock generating circuit.
Figure 6:
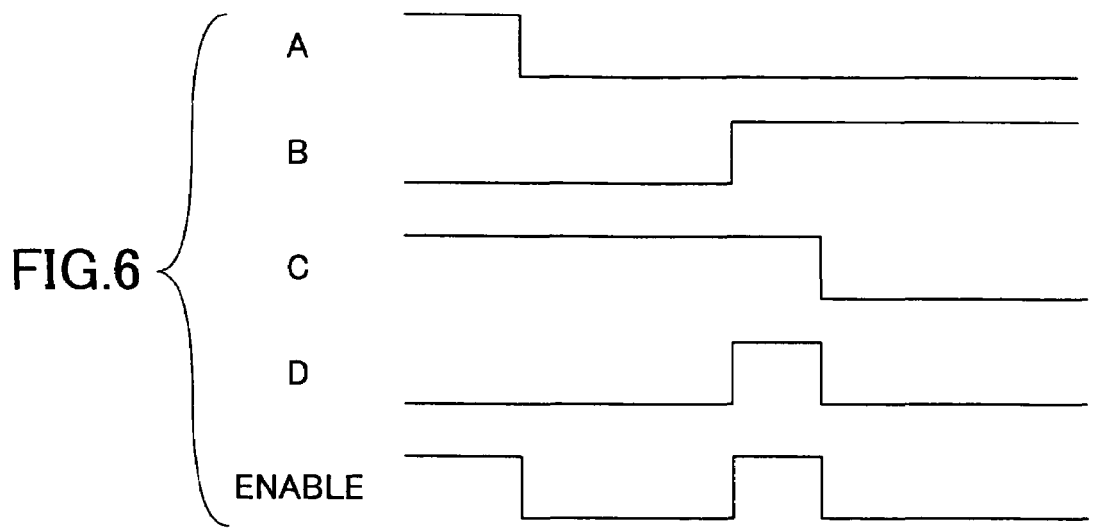
FIG. 6 is a signal diagram showing the waveform of output signals of respective comparators shown in FIG. 5.

FIG. 5 is a circuit diagram showing an example of a modified construction of the decimated clock generating circuit. The circuit of FIG. 5 includes the counter circuit 21, comparators 22A through 22C, registers 27A, 27B, 27C, 28A, 28B, and 28C, an AND gate 31, and an OR gate 32. A set of the resistors store preset pulse numbers and preset bit numbers like the registers 27 and 28 of FIG. 1. The size of the preset pulse number of each register is represented as: the register 27A< the register 27B< the register 27C. The comparators 22A and 22C output HIGH signals when the count is below the corresponding preset pulse number as does the comparator 22 of FIG. 1. The comparator 22B outputs a LOW signal when the count is below the corresponding preset pulse number. FIG. 6 is a signal diagram showing the waveforms of output signals A through C of the respective comparators 22A through 22C. The AND gate 31 and the OR circuit 32 perform logic operations on these output signals, thereby producing an ENABLE signal as shown in FIG. 6. In this manner, the signal ENABLE for generating the 2/15 clock shown in FIG. 3 is obtained. There may be a need to generate a complex decimated clock by selecting the first pulse, the third pulse, and the fifth pulse, etc. Such a need can also be satisfied easily by adding one or more sets of the registers 27B and 28B, the registers 27C and 28C, the comparator 22B, and the comparator 22C.

Figure 4:
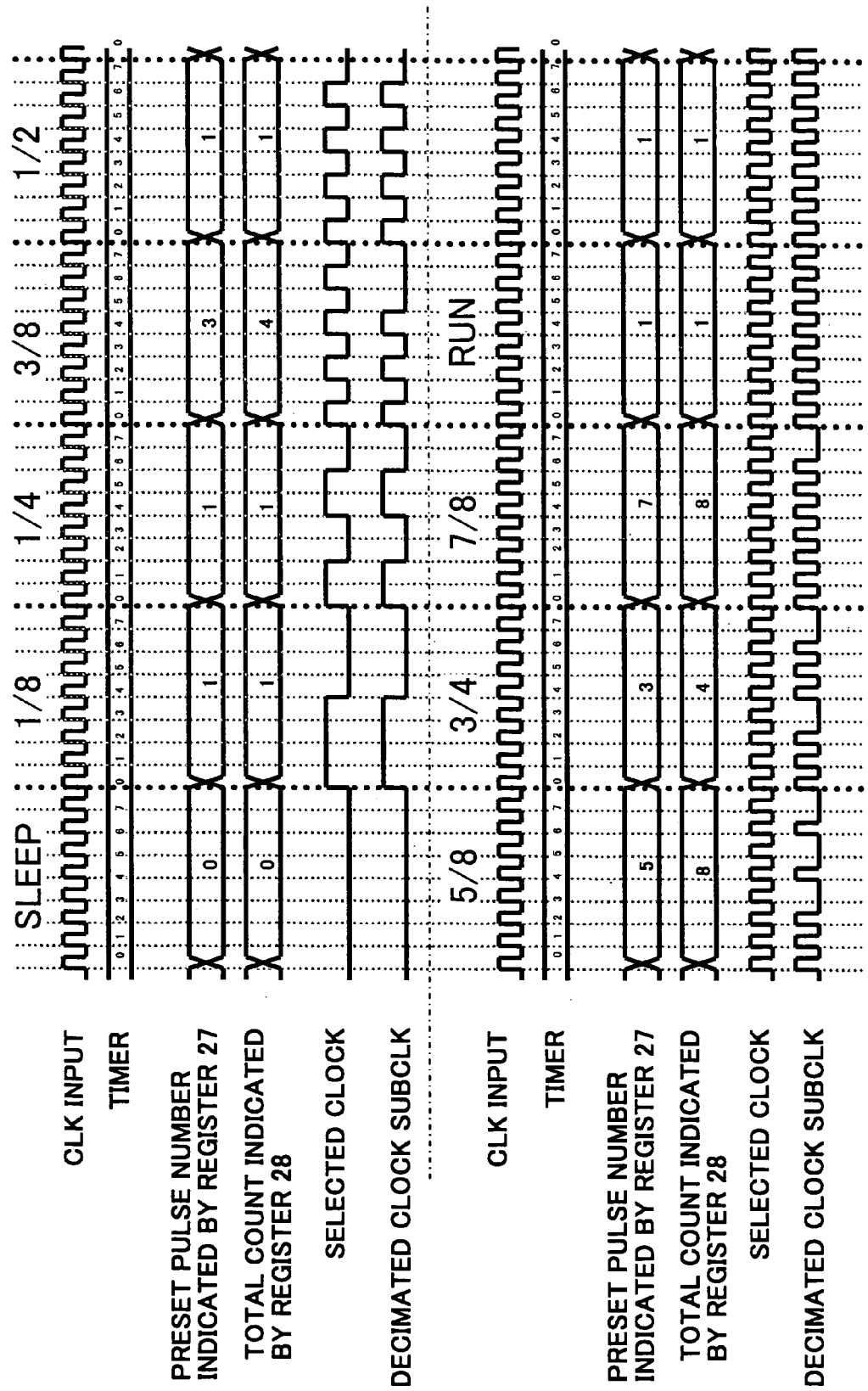
FIG. 4 is a timing chart for explaining clock shifts with reference to an example in which return from a sleep state is made.

FIG. 4 is a timing chart for explaining clock shifts with reference to an example in which return from the sleep state is made. In the example of FIG. 4, return to the normal clock frequency from the sleep state is made by successive stages of ⅛→¼→⅜→½→⅝→¾→⅞. In the example of FIG. 2, provision was made to use the clock change pattern of ¼→½→¾ whenever return is made in response to the mode change signal START. Needless to say, different clock change patterns may be used, depending on whether the original state is the sleep state or the suspended state.

In FIG. 4, an operation starts from the sleep state, and both the register 27 and the register 28 indicate "1" during a first duration. In the illustration of FIG. 4, the preset pulse number is shown with respect to the register 27, but a total count ($2^n$) indicated by the preset bit number n, rather than the preset bit number as it is, is shown with respect to the register 28, for the sake of explanation. According to such representation, pulses are selected for decimation at the ratio of the preset pulse number to the total count (Preset Pulse Number/Total Count).

During the first duration, the preset pulse number indicated by the register 27 and the total count indicated by the register 28 are both "1", so that the decimated clock generating circuit 13 selects all pulses. Further, the selector circuit 12 outputs a clock signal having 1/8 the frequency as the selected clock. The decimated clock generating circuit 13 outputs the selected clock as the decimated clock signal SUBCLK. As a result, the resulting clock signal has 1/8 the clock frequency (($1/8$)×($1/1$)), which has one pulse in a period equivalent to eight pulses of the clock signal CLK.

During a second duration, the preset pulse number indicated by the register 27 and the total count indicated by the register 28 are both "1", so that the decimated clock generating circuit 13 selects all pulses. Further, the selector circuit 12 outputs a clock signal having 1/4 the frequency as the selected clock. The decimated clock generating circuit 13 outputs the selected clock as the decimated clock signal SUBCLK. As a result, the resulting clock signal has 1/4 the clock frequency (($1/4$)×($1/1$)), which has two pulses in a period equivalent to eight pulses of the clock signal CLK.

During a third duration, the preset pulse number indicated by the register 27 and the total count indicated by the register 28 are "3" and "4", respectively. Further, the selector circuit 12 outputs a clock signal having 1/2 the frequency as the selected clock. The decimated clock generating circuit 13 selects three pulses out of every four pulses of the selected clock for outputting as the decimated clock signal SUBCLK. As a result, the resulting clock signal has 3/8 the clock frequency (($1/2$)×($3/4$)), which has three pulses in a period equivalent to eight pulses of the clock signal CLK.

During a fourth duration, the preset pulse number indicated by the register 27 and the total count indicated by the register 28 are both "1", so that the decimated clock generating circuit 13 selects all pulses. Further, the selector circuit 12 outputs a clock signal having 1/2 the frequency as the selected clock. The decimated clock generating circuit 13 outputs the selected clock as the decimated clock signal SUBCLK. As a result, the resulting clock signal has 1/2 the clock frequency (($1/2$)×($1/1$)), which has four pulses in a period equivalent to eight pulses of the clock signal CLK.

During a fifth duration, the preset pulse number indicated by the register 27 and the total count indicated by the register 28 are "5" and "8", respectively. Further, the selector circuit 12 outputs the original clock signal CLK as the selected clock. The decimated clock generating circuit 13 selects five pulses out of every eight pulses of the selected clock for outputting as the decimated clock signal SUBCLK. As a result, the resulting clock signal has 5/8 the clock frequency (($1/1$)×($5/8$)), which has five pulses in a period equivalent to eight pulses of the clock signal CLK.

During a sixth duration, the preset pulse number indicated by the register 27 and the total count indicated by the register 28 are "3" and "4", respectively. Further, the selector circuit 12 outputs the original clock signal CLK as the selected clock. The decimated clock generating circuit 13 selects three pulses out of every four pulses of the selected clock for outputting as the decimated clock signal SUBCLK. As a result, the resulting clock signal has 3/4 the clock frequency (($1/1$)×($3/4$)), which has six pulses in a period equivalent to eight pulses of the clock signal CLK.

During a seventh duration, the preset pulse number indicated by the register 27 and the total count indicated by the register 28 are "7" and "8", respectively. Further, the selector circuit 12 outputs the original clock signal CLK as the selected clock. The decimated clock generating circuit 13 selects seven pulses out of every eight pulses of the selected clock for outputting as the decimated clock signal SUBCLK. As a result, the resulting clock signal has 7/8 the clock frequency (($1/1$)×($7/8$)), which has seven pulses in a period equivalent to eight pulses of the clock signal CLK.

In this manner, when return from the sleep state is made, the normal clock frequency is restored through the successive stages of $1/8 \rightarrow 1/4 \rightarrow 3/8 \rightarrow 1/2 \rightarrow 5/8 \rightarrow 3/4 \rightarrow 7/8$.

In the invention as described above, the control signal controls the selector circuit and the decimated clock generating circuit according to a mode change signal, thereby gradually changing the clock signal at the time of a change of operation modes. Namely, when a change is made from a clock active state using a normal operating frequency to a clock suspended state, the clock signal is controlled such that the number of clock pulses per unit time is decreased gradually. When a change is made from a clock suspended state to a clock active state using a normal operating frequency, the clock signal is controlled such that the number of clock pulses per unit time is increased gradually. This avoids a sudden clock change, thereby preventing the consumption of electric currents from changing suddenly in circuitry using the clock signal, which prevents a regulator from generating an abnormal voltage.

Moreover, the use of the frequency divider and the decimated clock generating circuit makes it possible to generate a clock signal having any desired frequency of n/m (n, m: integers) that cannot be generated by use of the frequency divider alone. This achieves finer changes when the clock frequency is changed. Moreover, hardware-based control according to the invention can achieve high-speed operation that is not attainable by software-based control according to the conventional art.

Further, the present invention is not limited to these embodiments, but various variations and modifications may be made without departing from the scope of the present invention.

What is claimed is:

1. A circuit for changing clocks, comprising:
   a clock generating circuit generating an output clock signal by controlling a frequency of an original clock signal and comprising:
   a frequency divider which performs frequency division, and
   a decimated clock generating circuit which decimates clock pulses; and
   a control circuit controlling said clock generating circuit in response to an operation mode change signal, indicative of a change from a first operation mode to a second operation mode of an external circuit operating based on the output clock signal, thereby changing the output clock signal from a first frequency corresponding to the first operation mode to a third frequency and then from the third frequency to a second frequency corresponding to the second operation mode, the third frequency having a frequency between the first frequency and the second frequency.

2. The circuit as claimed in claim 1, wherein said control circuit controls said clock generating circuit so as to change the third frequency gradually between the first frequency and the second frequency.

3. The circuit as claimed in claim 1, wherein:
the frequency divider generates one or more frequency-divided clock signals by dividing the original clock signal;
said clock generating circuit further comprises a selector circuit which selects one of the original clock signal and said one or more frequency-divided clock signals as a selected clock signal;
the decimated clock generating circuit decimates one or more clock pulses of the selected clock signal for outputting as the output clock signal; and
said control circuit controls the selection performed by said selector circuit and the decimation performed by said decimated clock generating circuit in response to the operation mode change signal.

4. The circuit as claimed in claim 3, wherein said control circuit includes a memory circuit for storing data indicative of a time duration in which the intervening frequency is maintained.

5. The circuit as claimed in claim 4, wherein each said data stored in said memory circuit corresponds to one of a plurality of different types of the operation mode change signal.

6. The circuit as claimed in claim 3, wherein said control circuit includes a register for storing a rate of the pulse decimation performed by said decimated clock generating circuit.

7. The circuit as claimed in claim 6, wherein each said rate stored in said register corresponds to one of a plurality of different types of the operation mode change signal.

8. The circuit as claimed in claim 1, wherein the operation mode change signal is one of a plurality of types of operation mode change signals, and said control circuit changes the controlling of said clock generating circuit depending on a type of the operation mode change signal.

9. The circuit as claimed in claim 8, wherein the operation mode change signals include an operation mode change signal indicative of a change to a state in which an operation of the external circuit is suspended and an operation mode change signal indicative of a change to a state in which the operation of the external circuit is restored.

* * * * *